US008589666B2

(12) United States Patent
Hammes

(10) Patent No.: US 8,589,666 B2
(45) Date of Patent: Nov. 19, 2013

(54) ELIMINATION OF STREAM CONSUMER LOOP OVERSHOOT EFFECTS

(75) Inventor: Jeffrey Hammes, Colorado Springs, CO (US)

(73) Assignee: SRC Computers, Inc., Colorado Springs, CO (US)

(*) Notice: Subject to any disclaimer, the term of this patent is extended or adjusted under 35 U.S.C. 154(b) by 1985 days.

(21) Appl. No.: 11/456,466

(22) Filed: Jul. 10, 2006

(65) Prior Publication Data

US 2008/0010444 A1 Jan. 10, 2008

(51) Int. Cl.
*G06F 15/00* (2006.01)
*G06F 7/38* (2006.01)
*G06F 9/00* (2006.01)
*G06F 9/44* (2006.01)

(52) U.S. Cl.
USPC .............................................. 712/241; 714/18

(58) Field of Classification Search
USPC ........................................ 712/241, 201, 25
See application file for complete search history.

(56) References Cited

U.S. PATENT DOCUMENTS 7,085,955 B2 * 8/2006 Prabhu ............................... 714/6
2002/0124159 A1 * 9/2002 Bekooji et al. ................. 712/226

* cited by examiner

*Primary Examiner* — Andrew Caldwell
*Assistant Examiner* — George Giroux
(74) *Attorney, Agent, or Firm* — William J. Kubida; Hogan Lovells US LLP

(57) ABSTRACT

A reconfigurable processor invoking data stream pipelining is configured to associate a restore buffer with each incoming data stream. The buffer is configured to be of sufficient size to maintain data values dispatched to a loop so as to restore values fetched and lost due to loop overshoots. The restore buffer stores the values that were recently fetched from the buffer to the loop. To determine how many data values should be restored, the loop counts the number of the data values it takes from each data stream and the number of valid loop iterations that take place. Once a loop termination is detected, the loop halts the fetching of values from the restore buffer and compares, for each stream, the number of loop iterations with the number of values fetched. The difference is the number of extra values that were taken from the restore buffer and are restored.

22 Claims, 6 Drawing Sheets

ELIMINATION OF STREAM CONSUMER LOOP OVERSHOOT EFFECTS

COPYRIGHT NOTICE/PERMISSION

A portion of the disclosure of this patent document contains material which is subject to copyright protection. The copyright owner has no objection to the facsimile reproduction by anyone of the patent document of the patent disclosure as it appears in the United States Patent and Trademark Office patent file or records, but otherwise, reserves all copyright rights whatsoever. The following notice applies to the software and data and described below, inclusive of the drawing figures where applicable: Copyright® 2002, SRC Computers, Inc.

BACKGROUND OF THE INVENTION

1. Field of the Invention

The present invention relates, in general, to pipelined structures that are produced by reconfigurable hardware compilers, and more particularly to eliminating the effects of stream consumer pipelined loop overshoots in reconfigurable hardware.

2. Relevant Background

Reconfigurable computing is a technology receiving increased interest in the computing arts. Traditional general purpose computing is characterized by computer code executed serially on one or more general purpose processors. Reconfigurable computing is characterized by programming reconfigurable hardware, such as FPGAs to execute logic routines.

Reconfigurable computing offers significant performance advances in computation-intensive processing. For example, the reconfigurable hardware may be programmed with a logic configuration that has more parallelism and pipelining characteristics than a conventional instruction processor. Also, the reconfigurable hardware may be programmed with a custom logic configuration that is very efficient for executing the tasks assigned by the program. Furthermore, dividing a program's processing requirements between the instruction processor and the reconfigurable hardware may increase the overall processing power of the computer.

Software programs that are written in a high level language like, for example, C or Fortran can be converted by compilers targeting reconfigurable hardware into software that is executable on that hardware. Likewise, loop structures in the high level language may be converted by a compiler into a form that exploits parallelism and pipelining characteristics of reconfigurable hardware.

Data streams provide a flexible method for connecting concurrent producer and consumer loops in C and Fortran programs written for execution on reconfigurable hardware. Streams are also useful as a general interface between a reconfigurable hardware chip (typically a Field Programmable Gate Array ("FPGA")) and other chips, boards, memories, disks, real-time signal sources, and the like.

Reconfigurable hardware thus allows logic configurations to be built based upon the desired implementation. A program written in a high level programming language such as C or Fortran is converted into dataflow graphs that express the interconnection of functional units, and that are used to create specialized logic configurations. The dataflow graphs are analyzed and optimized to provide an optimal set of logic configurations for each particular high level program. For example, a data buffer in a loop structure can be designed based on the program computations that are going to be run once the logic configurations are loaded into the FPGAs. In that manner, the logic configurations provide an optimal fit for the application program. Once a compiler has constructed and optimized the dataflow graph, the graph is translated to a hardware description, expressed in a hardware description language. This hardware description can be synthesized by hardware synthesis tools to create logic configurations to run on reconfigurable hardware. The focus of the present invention is data stream pipelining as applied to the interconnection of loops running on reconfigurable hardware.

When a C or Fortran loop is a consumer of one or more streams of data, and that loop is pipelined, overlapping loop iterations are spawned with the goal of doing a maximal amount of work in as short a time as possible. To activate loop iterations as fast as possible, an iteration of a loop is spawned before the loop has determined whether the loop's termination condition has been reached, resulting in the activation of extra loop iterations. Those extra iterations are benign if they don't affect the state of the computation. But when loop iterations take values from streams subsequent to the star of an iteration that meets termination criteria, these extra iterations do affect the state of the computation because they take values that should not have been taken.

For instance, consider this simplified illustration. A mathematical operation counting to the sum of 1000 by increments of 1 may require a loop iteration of 1000 loops (i.e. add 1 to the previous total until the total equal 1000). Upon each clock tick, a piece of data is taken from the data stream and added to the previous total. Assume that actual computation of adding a single increment one number takes two clock ticks, one to add the number and one to compare the total to the value 1000. Therefore, when the total is 999 and the next piece of data is provided to the computation loop by the data stream the total will reach its termination criteria. However, while the computation determines that the total is equal to 1000 and signal that the loop should be halted, the next value has already been retrieved from the data stream. That last value should not have been taken.

A stream is a data path between a producer and consumer of data, where the producer and consumer run concurrently. The path between the producer and consumer is made up of a data connection, a "valid" signal, and a reverse direction "stall" signal. FIG. 1 shows typical signals used in a stream connection as is well known and will be recognized by one skilled in the relevant art. The use of a First-In-First-Out buffer 110, or "FIFO" buffer, removes the need for tight synchronization between the producer 120 and consumer 130. The producer 120 will generate data values 125 at its own rate, allowing them to accumulate in the FIFO buffer 110. As the FIFO buffer 110 approaches becoming full, it will issue a stall signal 140 to the producer 120 so that it will suspend the generation of data values 125 until the stall signal is released. The consumer 130 will take 150 values 145 from the FIFO buffer at its own rate and as the values 145 are available.

The use of the FIFO buffer, with the valid 135, stall 140 and take 150 signals, allows flexible coupling of stream producers and consumers. A stream's producer 120 and its consumers 130 may run at different speeds. For example, when the producer 120 runs faster than the consumer 130, then it will stall 140 from time to time as values fill the FIFO buffer. When the producer runs slower than the consumer, the FIFO will sometimes be empty and the consumer will wait for new values to be available.

When loops, in a high level language such as C or Fortran, are compiled for execution on reconfigurable hardware such as FPGAs, aggressive pipelining is employed, with the goal of achieving as great a throughput of data as possible. The body of an inner loop is converted to a dataflow graph with many individual functional units that are derived from the operators in the loop body. The FPGA implementations of these functional units may have latencies of one or more clock ticks, and the interconnection of many functional units will result in a loop body that can have new data fed in on every clock tick, even though it may take many clock ticks for the results of an iteration's data to reach the bottom of the dataflow graph. Thus many iterations are active at any point in time.

Part of the loop body's dataflow graph consists of the expression that computes a loop termination criteria. If a new loop iteration is activated on every clock tick, then extra loop iterations are activated despite a termination value being achieved. For example, when it takes three clocks for the data of a given loop iteration to produce the true/false termination value, then by the time the termination expression becomes true, three additional iterations of the loop will already have started. These extra iterations are harmless as long as they are not allowed to affect the state of the overall computation. However, the data acquired by the loop from the data stream may be lost.

Consider the following producer-consumer loops:

```
#pragma src parallel sections
{
    #pragma src section
    {
        int i;
        for (i=0; i<N*M; i++)
            put_stream (&S0, AL[i], 1);
    }
    #pragma src section
    {
        int i, idx, v;
        idx = 0;
        for (k=0; k<M; k++) {
            for (i=0; i<N; i++) {
                get_stream (&S0, &v);
                CL[idx++] = v;
            }
        }
    }
}
```

The first parallel section puts values to stream 'S0'. The second parallel section takes values from 'S0', but it does this in a loop nest. The inner loop of the nest will be pipelined as the compiler determines that it can spawn a new loop iteration on every clock tick because there are neither loop-carried dependencies nor multiple accesses to any memory.

FIG. 2 shows a high level block diagram of part of a simplified dataflow structure generated by a compiler for the consumer 130 inner loop as is known in the prior art. The compiler creates a FIFO buffer 110 for stream 'S0' 210, which receives the values from the stream's producer. The loop has a synchronization module or node 215 that watches the FIFO buffer 110 and spawns a loop iteration whenever it takes a value from the FIFO buffer 110, sending into the loop body 230 the stream value along with an "iteration" signal that tells the loop that a new iteration is being started. The boxes labeled 'R' represent registers $235_1, 235_2, \ldots 235_n$ that hold the various scalar variables and base address values referenced in the loop.

Part of the loop body 230 is composed of the loop termination expression. In the example presented above, termination is simply a comparison of 'i' and 'N'. The output, of the Compare node 240 goes false when the comparison is false, and the Loop Valid node 250 latches into a false state, telling the Terminate node 260 to emit a "done" pulse telling the Synchronization node 215 that the loop has reached its termination condition.

Because of pipelining, it can take multiple clock ticks for the effects of a value to move through the loop body 230, but when there are values available in the FIFO buffer 110, the Synchronization node 215 will take a value from the FIFO buffer and start a new loop iteration 235 on every clock tick. Assuming that the Compare node 240 and Loop Valid node 250 each have a one-clock tick latency, the Synchronization node 215 will spawn at least of couple of extra iterations before it sees that loop termination has occurred, and those extra loop iterations will have taken from the FIFO buffer values that should not have been taken.

This effect becomes even more pronounced when the termination expression is more complex. A rather extreme case arises from the following: for (i=0; i<w/v; i++) The "divide operation" is typically a many-clock latency operation; thirty or more clock ticks is not unusual, so the Synchronization node 215 of this loop 230 could spawn more than thirty extra iterations before it learns that the loop has reached termination.

The effect of these extra iterations on the consumer loop nest is twofold. First, when the inner loop is entered for the second time and it begins to fetch values from the stream, it will miss the values that had been erroneously fetched by the earlier extra spawned iterations. Thus the program will not compute correctly. Second, the parallel sections will eventually deadlock, because the loss of values means that the consumer will never see the number of values it is expecting.

There are important reasons for wanting a consumer loop nest to work correctly. In practical applications, there might be work to be done once a certain number of values have been read from a stream. In such a situation, the approach is to use data from the stream in a segmented fashion. It is, however, often impractical for the producer to be similarly segmented. For example, a data array from a distant memory might be the source of the stream, and the relatively high costs of starting up a data transfer of such an array make it beneficial to do one continuous stream rather than a series of small ones.

A straightforward solution to the problem of loop stream overshoot as is known in the prior art is to slow the iteration rate of the consumer loop so that it does not activate a new iteration until the current iteration's termination expression has been computed, but this would result in significant degradation of performance. The degradation would be especially bad in the cases of termination expressions that have large latencies, such as in the earlier example that does a divide operation. There the loop would be slowed by a factor of thirty or more, and such performance is unacceptable.

There is a need, therefore, for computer systems and computer implemented methodology for eliminating the effect of stream pipeline loop overshoot in reconfigurable data structures. Specifically, a need exists to preserve and restore values taken from a buffer as the result of on going loop operations during which time a valid termination criteria has been reached. These and other needs of the prior art are addressed by the present invention that is subsequently herein described in detail.

SUMMARY OF THE INVENTION

Briefly stated, the present invention involves computer implemented methods and computer systems for eliminating overshoot effects of pipelined consumer iterative computational loops. In a reconfigurable processor environment that invokes data stream pipelining during iterative computations, an FPGA or other reconfigured processor is configured to place two buffers between the producer of a data stream and the data consumer. In addition to a typically found FIFO buffer, a restore buffer is interposed between the producer and the consumer of the data values. The restore buffer is configured to be of sufficient size to maintain a persistent memory of enough data values dispatched to the iterative loop structure so as to restore data values fetched and lost due to pipelined consumer loop overshoots.

In one aspect of the present invention, a restore buffer is placed between each incoming stream and its consumer loop. The restore buffer stores the data values that were recently fetched from the buffer to the consumer so that later they can be restored. To determine how many data values should be restored, the iterative loop structure counts the number of the data values it takes from each data stream. The iterative loop structure also counts the number of valid loop iterations that take place. Once a loop termination is detected, the iterative loop structure halts fetching data values from the restore buffer and compares, for each stream, the number of loop iterations with the number of values fetched from each data stream. The difference is the number of extra data values that were taken from the restore buffer and must be restored. The iterative loop structure then directs the restore buffers to restore those values.

The foregoing and other features, utilities and advantages of the invention will be apparent from the following more particular description of an embodiment of the invention as illustrated in the accompanying drawings.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

Figure 1:
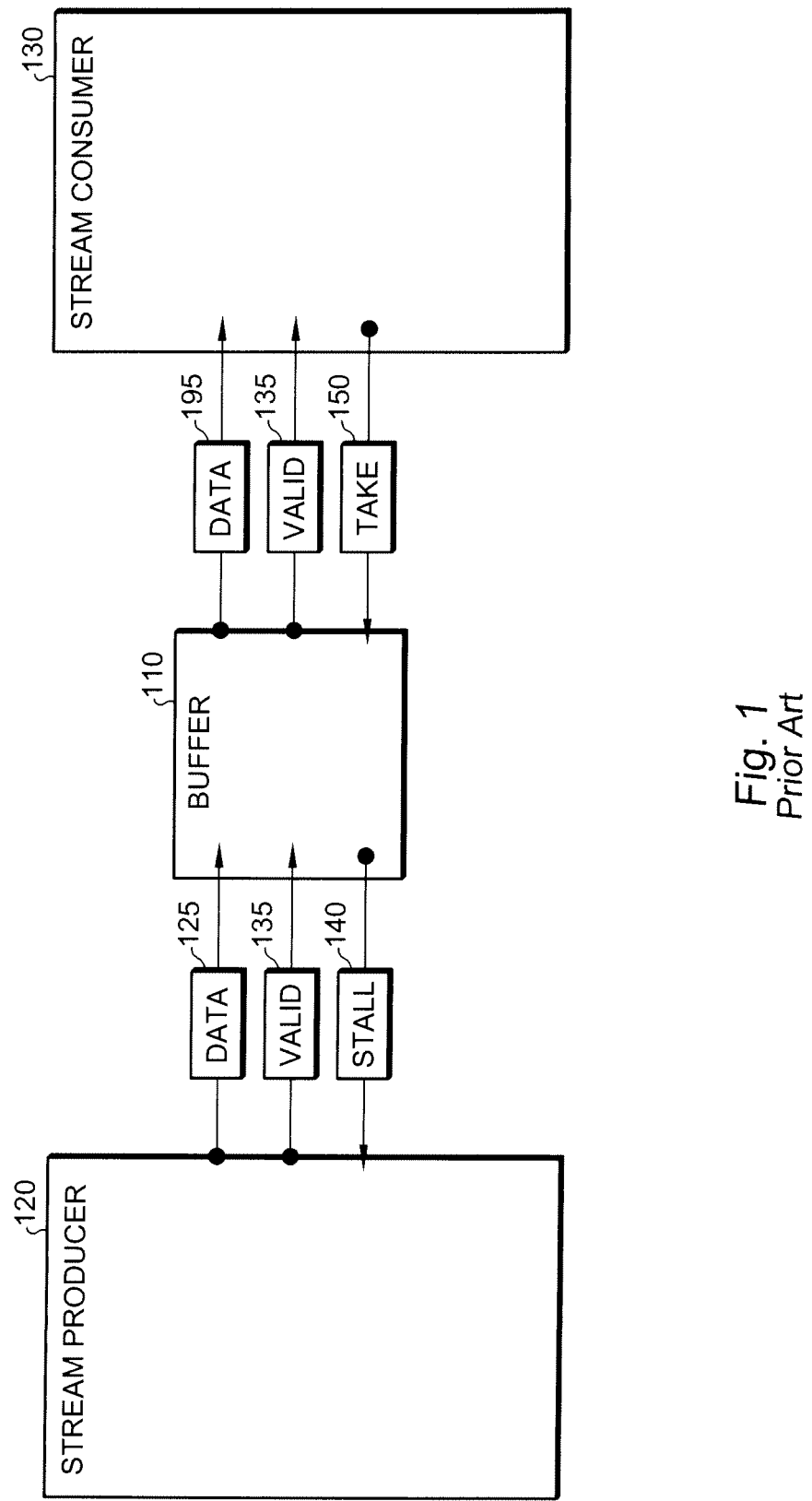
FIG. 1 shows a high level block diagram of a data structure having typical signals used in a stream connection between data producers and data consumers as known in the prior art.
Figure 2:
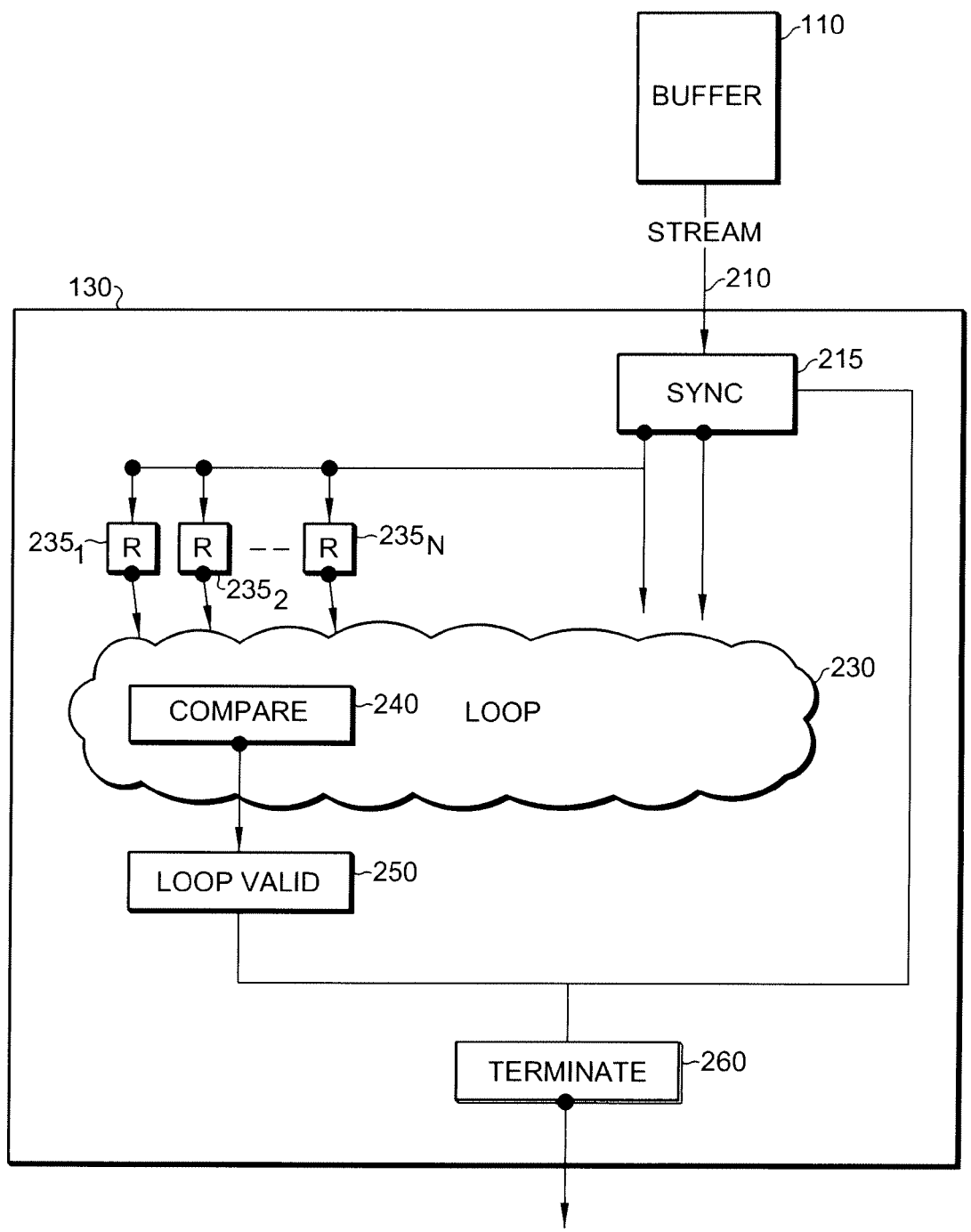
FIG. 2 shows a high level block diagram of part of a simplified data structure generated by a compiler for a consumer of data having an inner iteration loop as known in the prior art.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Computer systems and computer implemented methods for eliminating the effects of loop overshoots in the consumption of pipelined data streams are discussed in detail herein. In a pipelined data stream environment comprising a producer of data and a consumer of that data, the effects of consumer loop overshoots are eliminated by interposing, in one embodiment of the present invention, two buffers between the producer and consumer. As previously described, a typical configuration of a pipelined data stream structure places a single buffer between the producer and the consumer. Such a single buffer is typically configured to absorb differences in the production and consumption rate of the data streams, but does little to prevent the lost of data due to consumer loop overshoots.

Consumer loops are simple iterative processes that operate to provide a particular result. As a simple example, an addition operation may necessitate an iterative loop until a certain value is obtained. Consumer loops receive or fetch data values from a buffer and begin the looping process. Once launched, the computations continue until completed. Thus, using our simple addition example, the loop computation may comprise fetching a value, adding the value to the existing total, and then comparing the value to a predetermined number to determine if a termination criteria has been reached. This process may take two or three clock ticks of the processor. Thus even though there is additional data in the buffer available to the consumer, there is a lag between when a value has been fetched and when the loop has determined that it should terminate.

In reconfigurable computing, iterative loops such as those described above, are pipelined. Pipelining, as is well known to one skilled in the relevant art, is a process where instead of waiting for the completion of a particular loop iteration before fetching the next values and starting the next iteration, the loop aggressively fetches the next set of values on the very next clock tick, thereby starting a new iteration on each clock tick. Thus, there are several values, representing computations of several iterations, in the computational pipeline. Maintaining several loop iterations simultaneously for the same computation significantly enhances the efficiency of the computational process but as previously mentioned presents a problem when the termination criteria is eventually reached. When the termination criteria is reached, the loop has overshot the number of values it should have taken from the buffer. Under the prior art, this data would have been lost.

The present invention eliminates the loss of data due to consumer loop overshoot providing, in one embodiment, an additional buffer interposed between the producer and the consumer that remembers and can restore the data values that were fetched from the buffer after the value that resulted in the loop meeting termination criteria was fetched.

Figure 3:
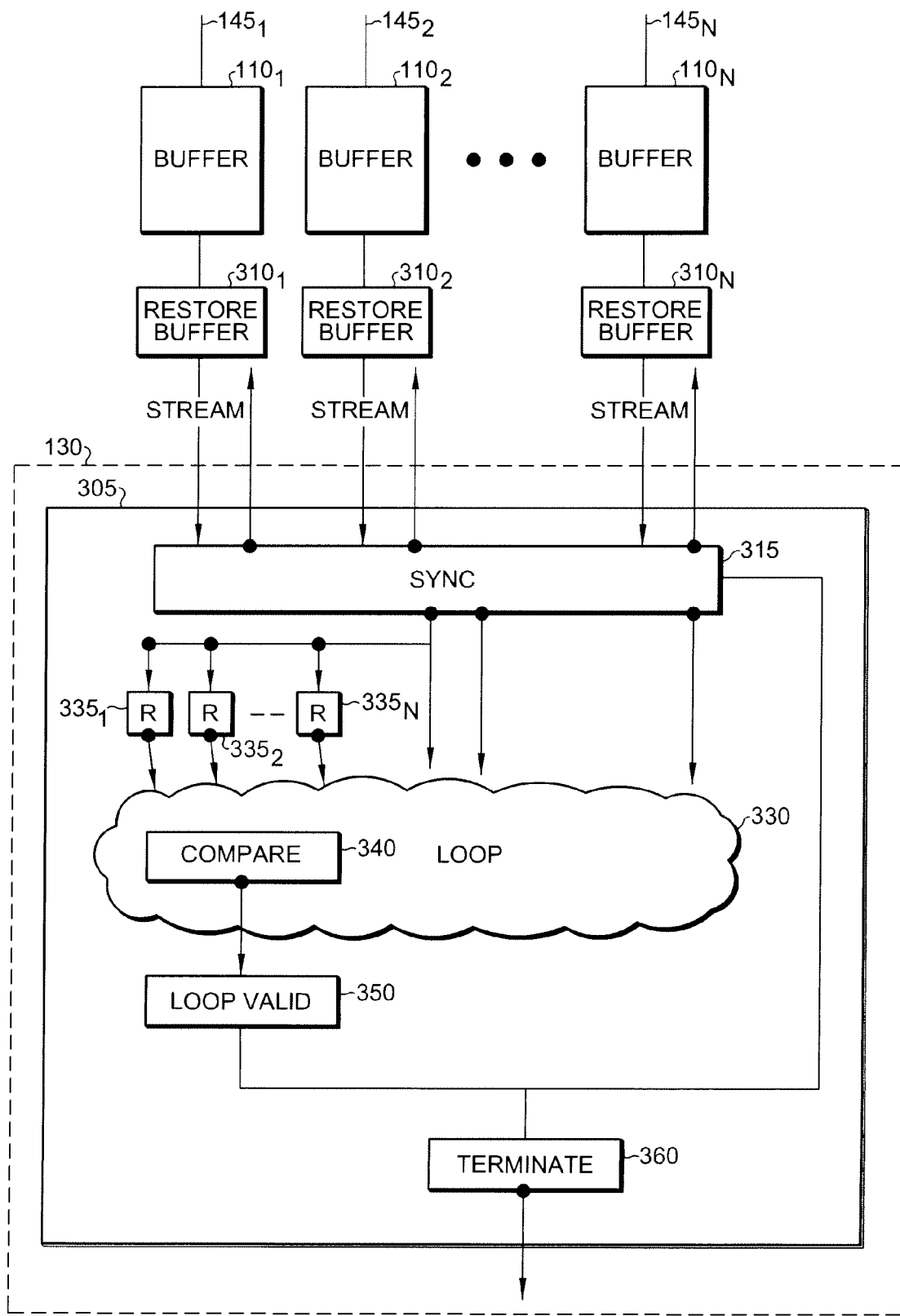
FIG. 3 shows a high level block diagram of a data flow structure for eliminating the effect of stream pipeline loop overshoots in accordance with one embodiment of the present invention.

A high level block diagram of a system for eliminating the effects of pipelined loop overshoots according to one embodiment of the present invention is shown in FIG. 3. As shown, a consumer 130 is coupled to a series of data streams $145_1$, $145_2$, ... $145_m$ providing data originating from a producer (not shown). Interposed between the consumer 130 and the producer, and associated with each data stream 145, are two buffers. The first buffer $110_1$, $110_2$, ... $110_m$ absorbs differences in the data flow rate between the producer 120 and the consumer 130. The second buffer, also referred to herein as the restore buffer, $310_1$, $310_2$, ... $310_m$ maintains data values for a period sufficient to allow the computations conducted by the consumer 130 to utilize a pipeline dataflow architecture, without the risk of data value loss. The restore buffer 310 keeps a persistent memory of data values fetched to the consumer so as to restore any overshoot values sent to the consumer as a function of loop computations. In other embodiments, the functionality of the restore buffer and that of the first buffer can be combined into a single buffer.

The consumer 130 comprises, at least in part, an iteration loop structure 305 that performs a loop computation. Associated with the iteration loop structure 305 is a Synchronization node 315, various registers $335_1$, $335_2$, . . . $335_o$ that hold various scalar variables and base address values referenced in the loop, the inner loop body 330 that conducts the computational loop and includes a Compare node 340, a Valid node 350 that determines when termination criteria has been met, and finally a Terminate node 360. According to one embodiment of the present invention, when the Compare node 340 goes false, the Valid node 350 communicates with the Terminate node 360 causing it to emit a message to the Synchronization node 315 informing it that the termination criteria has been reached. As will be apparent to one skilled in the relevant art, other implementations of a loop structure are possible without altering the scope of the present invention and are indeed contemplated by the present invention.

Upon receiving a message from the Terminate node 360 indicating that the termination criteria for the current computational loop has been met, the Synchronization node 315 halts fetching data values. During the period from when the value that resulted in the termination criteria being met was fetched and the Synchronization node 315 halting the fetching process, two possible edge cases, and any combination in between, can occur. The first edge case assumes that the data stream buffer 110, 310 that feeds the iteration loop structure 305 is never empty. In such a case, the iteration loop structure 315 will take a value from the data stream 145 on every clock tick. The number of extra data values taken from the restore buffer 310 prior to receiving a signal to halt is, in this scenario, at its maximum. The other edge case occurs when the data stream 145 empties with the last valid iteration. The last value taken from the data stream 145 results in the termination criteria being met and before another value is removed from the buffer 310, or is available to be removed, the Synchronization node 315 halts the fetching process. Thus there are no data values that are lost due to loop overshoot by the iteration loop structure 305.

According to one embodiment of the present invention, these and other data value overshoot scenarios are eliminated by counting the number of data values fetched from the restore buffer 310 of each data stream and comparing it to the number of valid loop iterations. Since the number of data values lost depends on the number of times at which data values arrive in the data stream buffer 145, the compiler that configures the computational structure for each computation cannot predict the number of values that will be lost from loop overshoot. It can, however, determine the worst case scenario by examining the dataflow graph of the loop and summing the latencies (in clock ticks) of the nodes on the path from the Synchronization node 315 to the termination signal being generated by the Terminate node 360.

In the case of multiple incoming data streams 145, the dynamic behavior of each incoming data stream 145 may be different, so that the number of overshoot values may differ among the streams 145. Thus, an individual count of the number of data values fetched must be kept for each stream. But since the compiler can determine an upper bound for the number of extra values taken, it can specify a restore buffer 310 of a sufficient size to retain that many values, thereby guaranteeing that all of the required values will be available, even in the worst case.

Figure 4:
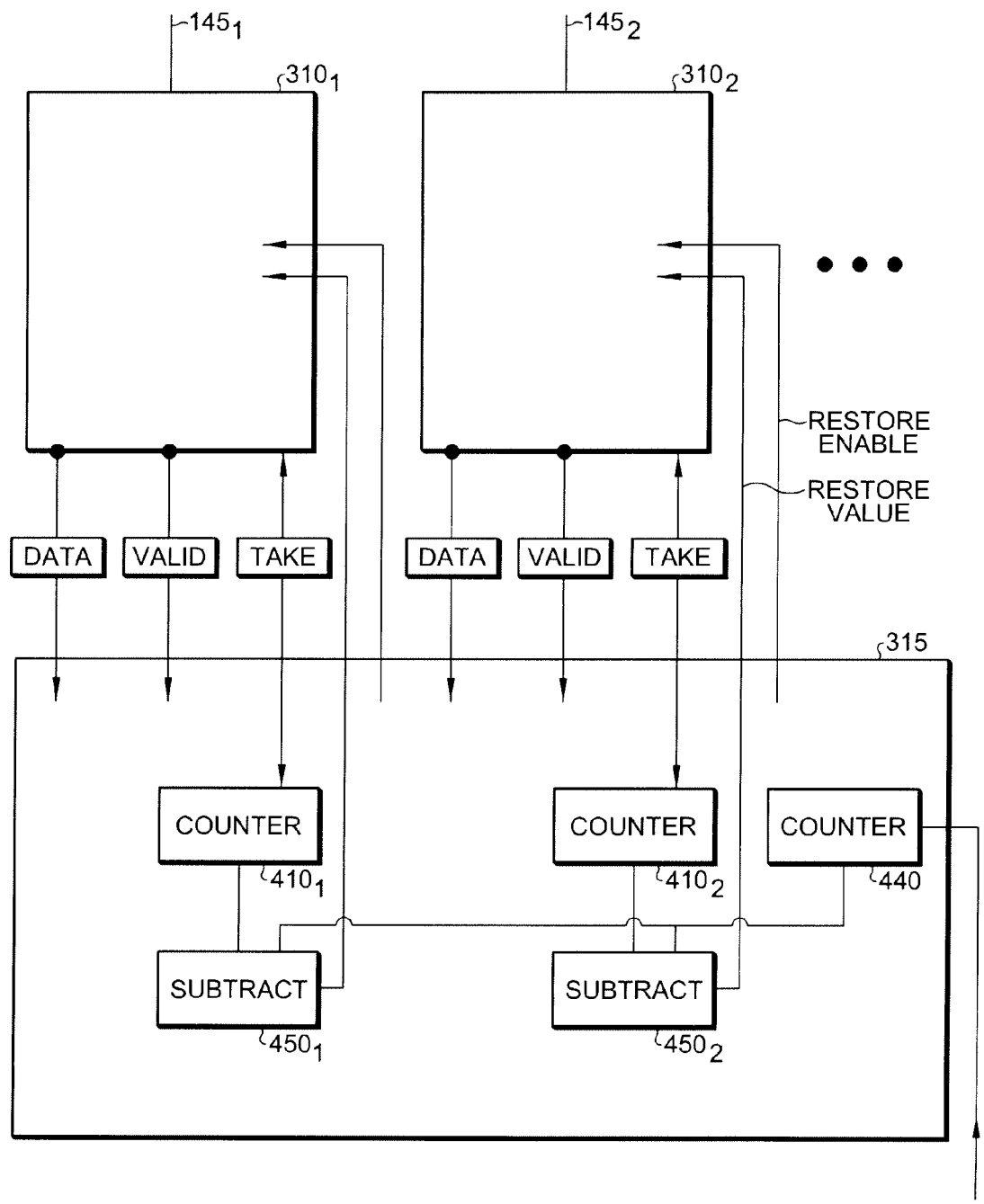
FIG. 4 shows a high level block diagram of one embodiment of a Synchronization node of a pipelined loop structure for eliminating the effect of pipeline loop overshoots in accordance with the present invention.

FIG. 4 shows a high level block diagram of one embodiment of a Synchronization node 315 of a pipelined loop structure for eliminating the effect of pipeline loop overshoots in accordance with the present invention. The Synchronization node 315 is coupled to a restore buffer $310_1$, $310_2$ for each of a plurality of data streams. The Synchronization node 315 is further coupled to the Valid node 350 and the Terminate node 360 (both not shown) and is capable of receiving signals informing of termination of the computational loop. Each restore buffer 310 is associated with a data value fetch counter $410_1$, $410_2$ that counts the number of fetches, or takes, conducted by the Synchronization node 315 for that particular buffer 310, thus determining a data fetch value. Depending on the state of the data stream, this number of fetches could be as high as one data value fetch per clock cycle over the length of the loop computation. A loop iteration counter 440 is also maintained, in this embodiment of the present invention, in the Synchronization node 315. The loop iteration counter 440 tracks the number of valid loop iterations determining a loop iteration value.

As shown in FIG. 4, the loop iteration counter 440 and each data value fetch counter 410 are in communication with a subtract node $450_1$, $450_2$. A subtract node 450 is associated with each restore buffer 310. Upon the Synchronization node 315 receiving a termination signal from the Terminate node 360, the subtract node 450 calculates the difference between the data fetch value supplied by the data value fetch counter 410 and the loop iteration value supplied by the loop iteration counter 440. The result is a restore value number that is communicated to the restore buffer 310 along with an enabling signal telling the restore buffer 310 to restore that number of data values.

In one embodiment of the present invention, the size of the restore buffer 310 is determined by two characteristics of the iteration loop structure 305. The first characteristic is the distance, measured in clock ticks, between the Synchronization node 315 and the Loop Valid node 350. The second characteristic is the rate at which the iteration loop structure 305 operates. For illustration purposes, consider, the following example.

Assume the inner body loop possesses a loop iteration computation of:

```
do {
    get_stream (&SO, &val);
    vl = A[i] * A[i + d]  + val;
    B[i] = vl;
    i++;
} while (vl < threshold);
```

Examining the iterative loop computation provided above, the iteration loop structure 305 and the inner body loop 305 takes 12 clock ticks for the effects of a data value fetched by the Synchronization node 315 to reach the output of the inner loop body 330, evaluated by the Loop Valid node 350, and communicated back to the Synchronization node 315. In a situation where a data value is taken on each clock tick, the restore buffer 310 for each data stream 145 must be capable of maintaining, at least temporarily, 12 data values. If the firing rate of the loop is two, meaning that it takes two clock ticks to fetch a data value, the maximum number of data values that would have to be restored is 6.

Using information of this type, a compiler targeting a reconfigurable processor can configure the dataflow pipelined loop structure to possess a first buffer to absorb differences between the consumer 130 and the producer 120 as well as a restore buffer 130 that eliminates any loss of data values due to pipeline loop overshoots.

Figure 5A:
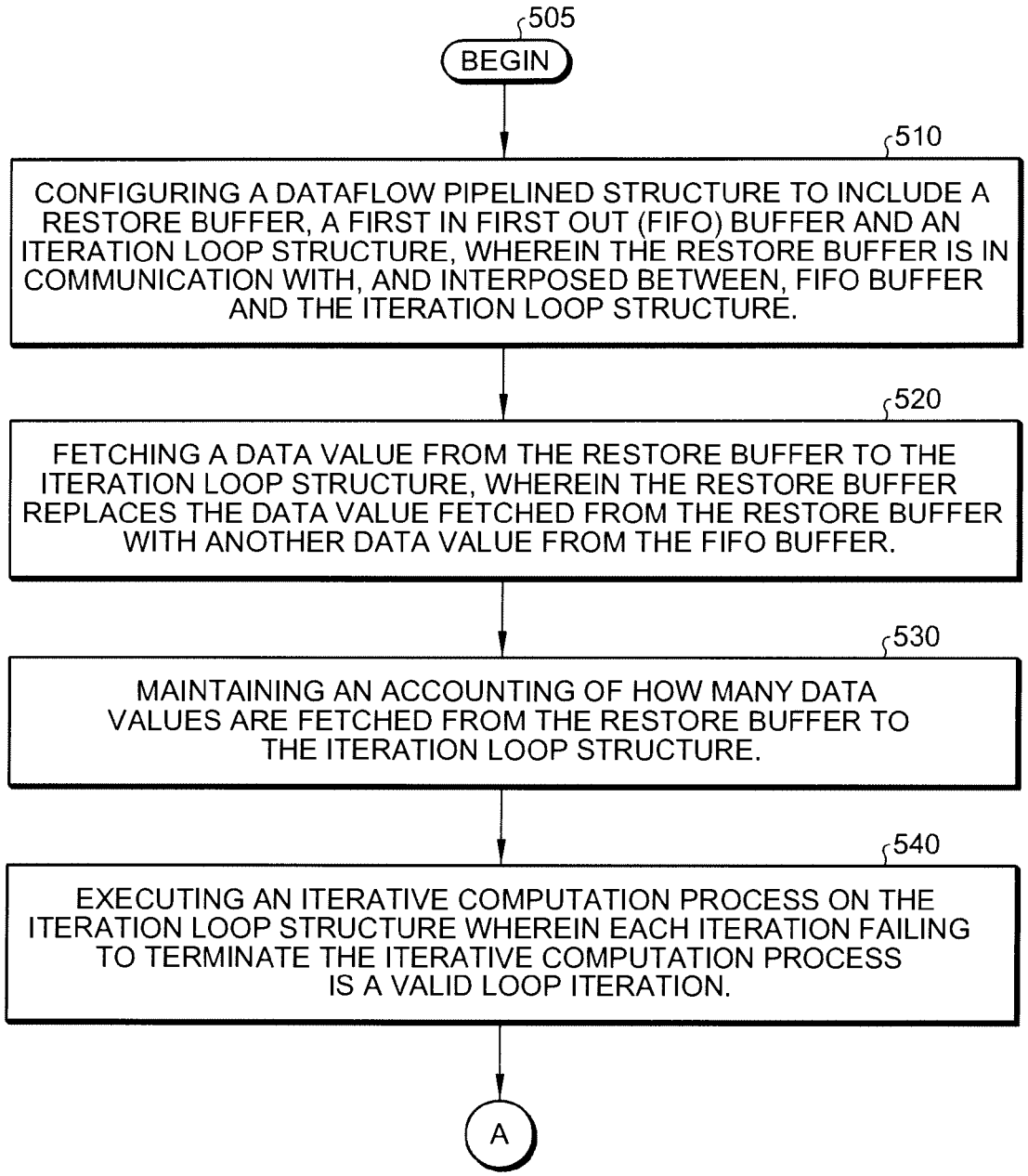
FIG. 5A and FIG. 5B comprise a flow diagram of one method embodiment of eliminating the effects of pipeline loop overshoots according to the present invention.
Figure 5B:
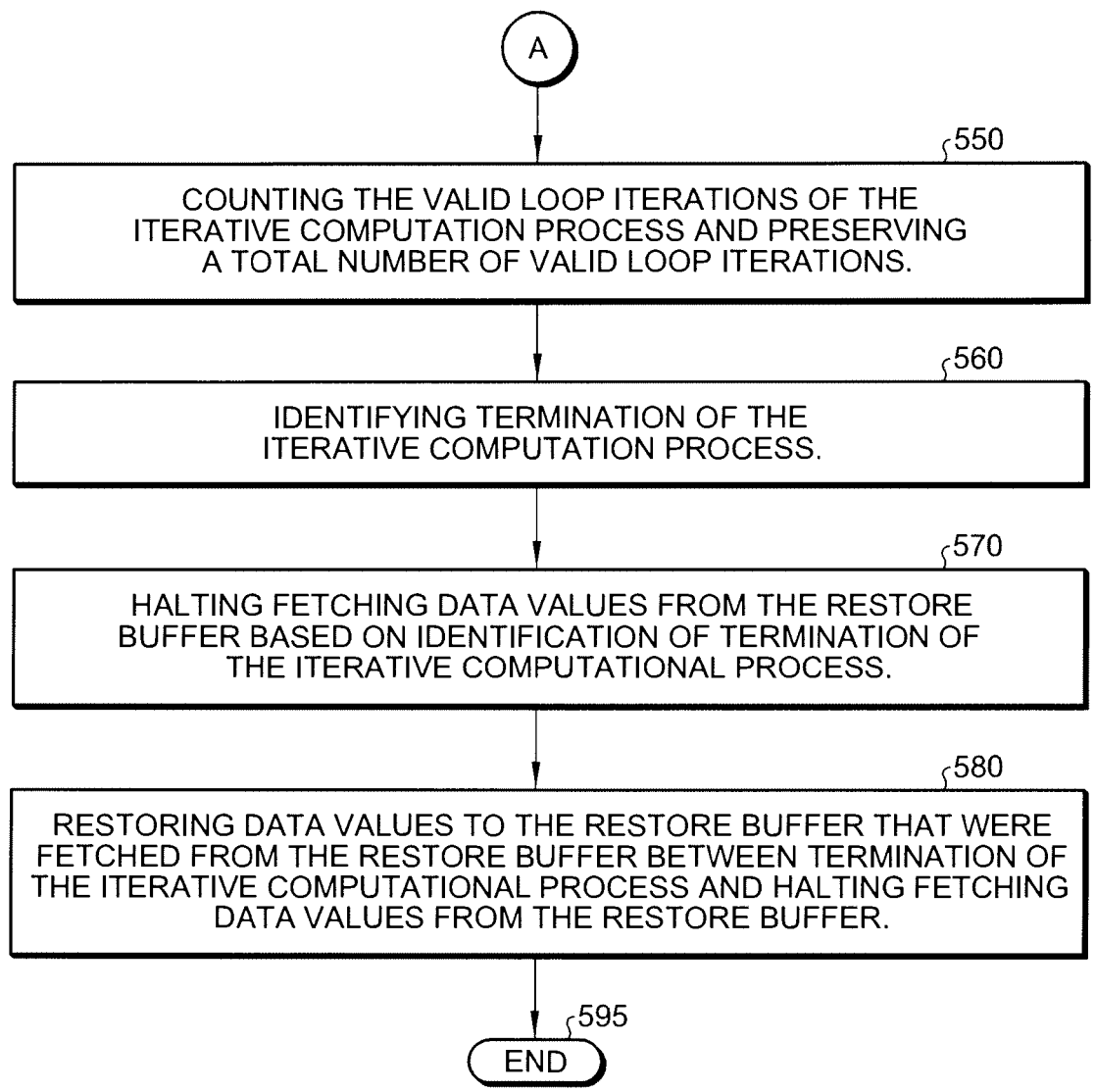

FIG. 5A and FIG. 5B comprise a flow diagram of one method embodiment of eliminating the effects of pipeline loop overshoot according to the present invention. The process begins 505 by configuring 510 a dataflow pipelined structure to include a restore buffer, a FIFO buffer, and an iteration loop structure. The FIFO buffer and the restore buffer are arranged in series so that the FIFO buffer receives data values from the producer and absorbs differences in the rates of consumption by the consumer versus production by the producer. Accordingly, the FIFO buffer size is typically based on the maximum number of values that could come from the producer after its stall signal has been asserted. As described herein, the restore buffer is interposed between the FIFO buffer and the iteration loop structure of the consumer. The size of the restore buffer is based on the latency of the iteration loop associated with the iteration loop structure and the rate at which data can be fetched from the restore buffer.

Once the iteration loop structure and the respective buffers are configured, a data value is fetched 520 from the restore buffer and placed into the iteration loop. The vacancy in the restore buffer is replaced by a corresponding data value from the FIFO buffer. As the computational loop of the iteration loop structure is carried out, a plurality of counters maintain an accounting 530 of how many data values are fetched 520 from the restore buffer to the iteration loop structure.

The iterative computation process executes 540 producing values that are determined to be either valid loop iterations or false loop iterations. Upon the return of a valid loop iteration, a second counter is incremented counting 550 the number of valid loop iterations of the computational iteration process thus determining and preserving the total number of valid loop iterations.

Eventually a value is fetched from the data stream that results in the termination of the iterative process. Identification of the termination criteria 560 by the Loop Valid node is communicated to the Synchronization node that halts 570 the fetching of data values from the restore buffer. Once the iterative process has been properly terminated and the fetching of additional data values from the data stream halted, the difference between the number of data values fetched from the restore buffer and the number of iteration loops completed can be calculated. The value of this difference is communicated to the restore buffer along with an enabling signal that loop termination has been signaled commanding the restored buffer to restore 580 data values to the restore buffer that were fetched after the value resulting in the termination was fetched but prior to the Synchronization node halting the fetching process. By restoring these mistakenly fetched values, no data values are lost due to consumer pipeline loop overshoots.

While the invention has been particularly shown and described with reference to a preferred embodiment thereof, it will be understood by those skilled in the art that various other changes in the form and details may be made without departing from the spirit and scope of the invention. Likewise, the particular naming and division of the nodes, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

I claim:

1. A computer implemented method for eliminating loop overshoot effects in a reconfigurable processor, the method comprising:
   configuring in a field programmable gate array a dataflow pipelined structure, wherein the dataflow pipelined structure includes a restore buffer in communication with, and interposed between, a First-In First-Out (FIFO) buffer and an iteration loop structure;
   fetching a data value from the restore buffer to the iteration loop structure, wherein the restore buffer replaces the data value fetched from the restore buffer with another data value from the FIFO buffer and wherein the restore buffer is configured to continually maintain a number of data values, the number of data values continually maintained based on the iteration loop structure of the dataflow pipeline structure;
   maintaining an accounting of how many data values are fetched from the restore buffer to the iteration loop structure;
   executing an iterative computation process on the iteration loop structure wherein each iteration failing to terminate the iterative computation process is a valid loop iteration;
   counting the valid loop iterations of the iterative computation process and preserving a total number of valid loop iterations;
   identifying termination of the iterative computation process;
   halting fetching data values from the restore buffer based on identification of termination of the iterative computational process; and
   restoring data values to the restore buffer that were fetched from the restore buffer between termination of the iterative computational process and halting fetching data values from the restore buffer based on identification of termination of the iterative computational process.

2. A computer implemented method of claim 1, wherein two or more data values are fetched from the restore buffer during each iterative computation process.

3. A computer implemented method of claim 1, wherein the restore buffer is configured prior to beginning the iterative computation process based on a maximum number of values that can be fetched by the iteration loop structure during the iterative computational process and before fetching of data values can be halted based on identification of termination of the iterative computational process.

4. A computer implemented method of claim 1, wherein the restore buffer is configured to continually maintain the number of data values after they have been fetched by the iteration loop structure on a FIFO basis replacing old values with new values.

5. A reconfigurable computer system including a dataflow pipelined structure that eliminates loop overshoot effects, the system comprising:

a first buffer;

a second buffer;

a multi-adaptive processor, wherein the multi-adaptive processor includes field programmable gate arrays; and a multi-adaptive processor compiler capable of creating a plurality of code portions executable on the multi-adaptive processor, wherein one of the code portions is operable to create a pipelined data stream structure having at least one pipeline data stream, for each pipeline data stream the pipelined data stream structure comprising:

a data producer coupled to the first buffer, wherein the first buffer stores data values produced by the data producer;

a data consumer in communication with the first buffer, the data consumer having a loop structure, wherein the loop structure is configured to have a Synchronization node that determines a loop iteration value and a data fetch value, and a loop Terminate node that determines whether a loop termination condition has been reached, wherein execution of an iterative computation process on the loop structure that fails to terminate the iterative computation process is a valid loop iteration, and wherein the second buffer is interposed between the first buffer and the loop structure of the data consumer and is configured to continually maintain a number of data values, the number of data values based on the loop structure, so as to restore data values from the at least one pipelined data stream mistakenly sent to the loop structure after the loop termination condition has been reached.

6. The computer system of claim 5, wherein values mistakenly sent to the loop structure are identified based on a difference between the loop iteration value and the data fetch value.

7. The computer system of claim 5, wherein the first buffer is a First-In First-Out buffer.

8. The computer system of claim 5, wherein the loop iteration value represents iterations completed by the loop structure conducting a loop computation until reaching the loop termination condition.

9. The computer system of claim 8, wherein the data fetch value represents a number of values fetched during the loop computation until receiving the loop termination condition.

10. The computer system of claim 8, wherein the difference between the loop iteration value and the data fetch value is a number of values received by the loop structure that must be restored.

11. The computer system of claim 8, wherein the Synchronization node, upon receiving the loop termination condition, stops subsequent fetching of values and directs the second buffer to restore improperly fetched values, wherein improperly fetched values comprise values fetched to the loop structure after a termination value received by the loop structure results in the loop termination condition being reached.

12. The computer system of claim 5, wherein the loop structure is further configured to include a counter node and a Valid Loop node, wherein the Valid node identifies valid loop iterations, and wherein the counter node counts valid loop iterations as well as counts take signals sent from the loop structure to the second buffer fetching values from the at least one pipelined data stream.

13. The computer system of claim 5, wherein the second buffer receives a data value from the first buffer based on take signals sent to the second buffer from the loop structure.

14. The computer system of claim 13, wherein a difference between the number of take signals sent from the loop structure to the second buffer and the number of valid loop iterations subsequent to the loop termination condition being reached identifies the values to be restored by the second buffer.

15. The computer system of claim 5, wherein the multi-adaptive compiler configures the second buffer, prior to initiation of the iterative computation process, based on a maximum number of values that can be fetched by the loop structure between when a termination value is fetched from the second buffer resulting in the loop termination condition being reached and the Synchronization node stops fetching values due to receiving the loop termination condition.

16. The computer system of claim 5, wherein the second buffer is configured to maintain a predetermined number of data values after they have been fetched by the loop structure.

17. A reconfigurable computer system including a multi-adaptive processor and a multi-adaptive compiler, the multi-adaptive compiler capable of converting high level instructions into code executable in the multi-adaptive processor, including instructions configured to form a pipelined structure that eliminates loop overshoot effects, the pipelined structure comprising:

a first buffer configured to receive a pipeline data stream; and a second buffer in communication with the first buffer configured to restore values from the pipelined data stream sent to a loop structure after a termination value has been sent to the loop structure but before a termination condition has been received from the loop structure, the second buffer configured to continually maintain a number of values, the number of values maintained based on the loop structure, wherein the loop structure is configured to include a counter node and a Valid Loop node wherein the counter node counts valid loop iterations as well as counts take signals sent from the loop structure to the second buffer fetching values from the at least one pipelined data stream.

18. The computer system of claim 17, wherein the second is a First-In First-Out buffer that receives a data value from the first buffer based on take signals sent from the loop structure.

19. The computer system of claim 17, wherein a difference between the number of take signals sent from the loop structure to the second buffer and the number of valid loop iterations subsequent to the loop termination condition being reached identifies values to be restored by the second buffer.

20. The computer system of claim 17, wherein the termination value causes the termination condition to occur.

21. The computer system of claim 17, wherein the second buffer is configured by the multi-adaptive compiler to maintain the number of values based on a maximum number of iterations that the loop structure can iterate before being halted based on receiving the termination condition from the pipeline loop structure.

22. The computer system of claim 17, wherein the second buffer is configured to maintain a predetermined number of values after they have been sent to the loop structure.

* * * * *